(12) United States Patent
Li et al.

(10) Patent No.: US 9,647,858 B2
(45) Date of Patent: May 9, 2017

(54) OPTIMIZING APPARATUS AND METHOD FOR A PULSE SHAPING FILTER AND A TRANSMITTER

(71) Applicant: FUJITSU LIMITED, Kawasaki-shi, Kanagawa (JP)

(72) Inventors: Hui Li, Beijing (CN); Takanori Iwamatsu, Kawasaki (JP); Jianmin Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/675,276

(22) Filed: Mar. 31, 2015

(65) Prior Publication Data
US 2015/0280944 A1 Oct. 1, 2015

(30) Foreign Application Priority Data
Mar. 31, 2014 (CN) .......................... 2014 1 0126077

(51) Int. Cl.
*H04K 1/02* (2006.01)
*H04L 25/03* (2006.01)
*H04L 25/49* (2006.01)

(52) U.S. Cl.
CPC ................................ *H04L 25/0384* (2013.01)

(58) Field of Classification Search
CPC ........... H04L 25/03834; H04L 27/2614; H04L 27/3411; H04L 27/2623; H04B 1/7172; H04B 1/7174; H04B 1/7107
(Continued)

(56) References Cited

U.S. PATENT DOCUMENTS

| 5,381,449 A * | 1/1995 | Jasper .................. H04L 5/0048 |
| | | 332/103 |
| 2002/0150184 A1* | 10/2002 | Hafeez ................ H04L 25/0202 |
| | | 375/346 |

(Continued)

OTHER PUBLICATIONS

H. G. Myung, J. Lim and D. J. Goodman, "Peak-To-Average Power Ratio of Single Carrier FDMA Signals with Pulse Shaping," Personal, Indoor and Mobile Radio Communications, 2006 IEEE 17th International Symposium on, Helsinki, 2006, pp. 1-5.*

(Continued)

*Primary Examiner* — Tesfaldet Bocure
*Assistant Examiner* — Amneet Singh
(74) *Attorney, Agent, or Firm* — Arent Fox LLP

(57) ABSTRACT

Embodiments of the present invention provide an optimizing apparatus and method for a pulse shaping filter and a transmitter. The apparatus is configured to determine an initial peak-to-average power ratio threshold of the pulse shaping filter, and determine an initial filter coefficient of the pulse shaping filter according to the initial peak-to-average power ratio threshold; determine a constraint condition for optimizing the pulse shaping filter according to the initial peak-to-average power ratio threshold and the initial filter coefficient of the pulse shaping filter; wherein the constraint condition comprises a threshold constraint in a filter coefficient sign domain; and adjust the initial peak-to-average power ratio threshold and the initial filter coefficient of the pulse shaping filter in a case where the constraint condition is satisfied, until a predefined condition is satisfied, so as to obtain an optimized filter coefficient of the pulse shaping filter.

8 Claims, 5 Drawing Sheets

(58) Field of Classification Search
USPC ........ 375/285, 295, 296, 297; 332/123, 124, 332/125, 159, 160
See application file for complete search history.

(56) References Cited

U.S. PATENT DOCUMENTS

| | | | | |
|---|---|---|---|---|
| 2003/0063682 | A1* | 4/2003 | Shearer | H04L 25/03834 375/295 |
| 2004/0096022 | A1* | 5/2004 | Zhang | H04L 25/493 375/353 |
| 2007/0053420 | A1* | 3/2007 | Koyanagi | H03H 17/06 375/232 |
| 2007/0083581 | A1* | 4/2007 | Kim | H03H 17/0225 708/300 |
| 2007/0230593 | A1* | 10/2007 | Eliaz | H04B 1/7172 375/260 |
| 2008/0187072 | A1* | 8/2008 | Schell | H04L 25/03834 375/296 |
| 2010/0128776 | A1* | 5/2010 | Lee | H04L 25/03834 375/239 |
| 2012/0163489 | A1* | 6/2012 | Ramakrishnan | H04L 25/03834 375/279 |
| 2014/0286447 | A1* | 9/2014 | Ling | H04L 27/2614 375/260 |

OTHER PUBLICATIONS

M. V. R. Vittal, K. Ramanaidu and C. Subhas, "PAPR analysis of single carrier FDMA signals with Gaussian pulse shaping," Communications and Signal Processing (ICCSP), 2013 International Conference on, Melmaruvathur, 2013, pp. 776-780.*

Cesar A. Azurdia-Meza, Kyujin Lee, Kyesan Lee, "PAPR Reduction in Single Carrier FDMA Uplink by Pulse Shaping Using a β-α Filter," Wireless Pers Commun (2013) 71:23-44, Published online: Aug. 9, 2012.*

S. Boyd and L. Vandenberghe, "Convex Optimization". Cambridge, U.K., Mar. 2004.

* cited by examiner

OPTIMIZING APPARATUS AND METHOD FOR A PULSE SHAPING FILTER AND A TRANSMITTER

CROSS-REFERENCE TO RELATED APPLICATION

This application is based upon and claims the benefit of priority of the prior Chinese Patent Application No. 201410126077.3, filed on Mar. 31, 2014, the entire contents of which are incorporated herein by reference.

TECHNICAL FIELD

The present invention relates to the field of communications, and in particular to an optimizing apparatus and method for a pulse shaping filter and a transmitter.

BACKGROUND ART

In order to increase efficiency of power amplification of a wireless transmitter, a peak-to-average power ratio (PAPR) for transmitting signals needs to be lowered. Existing methods for lowering a peak-to-average power ratio are mainly applicable to a multicarrier system, and are generally realized by changing phase relationship between the subcarriers. While in a single-carrier system, a peak-to-average power ratio for transmitting signals is mainly decided by the following two factors: one is an order of modulation signals, and the other is a filter coefficient of a pulse shaping filter.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

Currently, existing methods for lowering a peak-to-average power ratio applicable to a single-carrier system generally need to change the structure of an existing communication system, which is high in complexity and costs are increased. And use of a pulse shaping filter of a low peak-to-average power ratio can lower a peak-to-average power ratio for transmitting signals without changing the structure of the existing communication system. However, in using existing optimization methods to optimize a filter coefficient, as an objective function of the peak-to-average power ratio is not derivable, there exists difficulty in the design of a pulse shaping filter of a low peak-to-average power ratio.

Embodiments of the present invention provide an optimizing apparatus and method for a pulse shaping filter and a transmitter. Optimization according to a constraint condition including a threshold constraint in a filter coefficient sign domain can simply and conveniently obtain a pulse shaping filter of a low peak-to-average power ratio, thereby efficiently lowering a peak-to-average power ratio for transmitting signals without changing the structure of an existing communication system.

According to a first aspect of embodiments of the present invention, there is provided an optimizing apparatus for a pulse shaping filter, including: a first determining unit configured to determine an initial peak-to-average power ratio threshold of the pulse shaping filter, and determine an initial filter coefficient of the pulse shaping filter according to the initial peak-to-average power ratio threshold; a second determining unit configured to determine a constraint condition for optimizing the pulse shaping filter according to the initial peak-to-average power ratio threshold and the initial filter coefficient of the pulse shaping filter; wherein the constraint condition includes a threshold constraint in a filter coefficient sign domain; and an optimizing unit configured to adjust the initial peak-to-average power ratio threshold and the initial filter coefficient of the pulse shaping filter in a case where the constraint condition is satisfied, until a predefined condition is satisfied, so as to obtain an optimized filter coefficient of the pulse shaping filter.

According to a second aspect of embodiments of the present invention, there is provided a transmitter, including the optimizing apparatus for a pulse shaping filter as described in the first aspect of the embodiments of the present invention.

According to a third aspect of embodiments of the present invention, there is provided an optimizing method for a pulse shaping filter, including: determining an initial peak-to-average power ratio threshold of the pulse shaping filter, and determining an initial filter coefficient of the pulse shaping filter according to the initial peak-to-average power ratio threshold; determining a constraint condition for optimizing the pulse shaping filter according to the initial peak-to-average power ratio threshold and the initial filter coefficient of the pulse shaping filter; wherein the constraint condition includes a threshold constraint in a filter coefficient sign domain; and adjusting the initial peak-to-average power ratio threshold and the initial filter coefficient of the pulse shaping filter in a case where the constraint condition is satisfied, until a predefined condition is satisfied, so as to obtain an optimized filter coefficient of the pulse shaping filter.

An advantage of embodiments of the present invention exists in that optimization according to the constraint condition including the threshold constraint in the filter coefficient sign domain can simply and conveniently obtain a pulse shaping filter of a low peak-to-average power ratio, thereby efficiently lowering a peak-to-average power ratio for transmitting signals without changing the structure of an existing communication system.

With reference to the following description and drawings, the particular embodiments of the present invention are disclosed in detail, and principles of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. It is obvious that the drawings described below are embodiments of the present invention only, and to those skilled in the art, other accompanying drawings may be obtained according to these drawings without making an inventive effort. In the drawings.

DETAILED DESCRIPTION

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Embodiment 1

Figure 1:
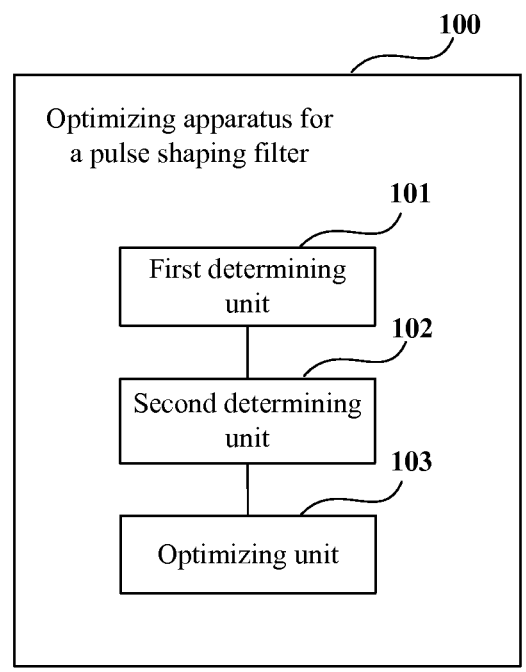
FIG. 1 is a schematic diagram of structure of an optimizing apparatus for a pulse shaping filter of Embodiment 1 of the present invention.

FIG. 1 is a schematic diagram of the structure of an optimizing apparatus for a pulse shaping filter of Embodiment 1 of the present invention. As shown in FIG. 1, the apparatus 100 includes: a first determining unit 101, a second determining unit 102 and an optimizing unit 103; wherein, the first determining unit 101 is configured to determine an initial peak-to-average power ratio threshold of the pulse shaping filter, and determine an initial filter coefficient of the pulse shaping filter according to the initial peak-to-average power ratio threshold;

the second determining unit 102 is configured to determine a constraint condition for optimizing the pulse shaping filter according to the initial peak-to-average power ratio threshold and the initial filter coefficient of the pulse shaping filter; wherein the constraint condition includes a threshold constraint in a filter coefficient sign domain;

and the optimizing unit 103 is configured to adjust the initial peak-to-average power ratio threshold and the initial filter coefficient of the pulse shaping filter in a case where the constraint condition is satisfied, until a predefined condition is satisfied, so as to obtain an optimized filter coefficient of the pulse shaping filter.

It can be seen from the above embodiment that optimization according to the constraint condition including the threshold constraint in the filter coefficient sign domain can simply and conveniently obtain a pulse shaping filter of a low peak-to-average power ratio, thereby efficiently lowering a peak-to-average power ratio for transmitting signals without changing the structure of an existing communication system.

In this embodiment, the first determining unit 101 determines the initial peak-to-average power ratio threshold of the pulse shaping filter on-demand for the current condition, and determines the initial filter coefficient of the pulse shaping filter by using any existing method after the initial peak-to-average power ratio threshold is determined. For example, a peak-to-average power ratio obtained according to the initial filter coefficient is made to be less than or equal to the initial peak-to-average power ratio threshold, that is, satisfying a threshold constraint based on the initial peak-to-average power ratio threshold.

In determining the initial filter coefficient according to the initial peak-to-average power ratio threshold in this embodiment, in addition to the above threshold constraint, other existing constraint conditions may also be included; for example, an inter-symbol-interference free constraint, a spectrum constraint, and a power constraint, etc., may also be included.

In this embodiment, the peak-to-average power ratio of the pulse shaping filter may be calculated by using formula (1) below:

$$f(s) = \frac{\max_{0 \le j \le N-1} \left\{ \sum_{i=1}^{M} |s(j + (i-1)*N)| \right\}^2}{\frac{1}{N} \sum_{n=0}^{MN} s(n)^2}; \quad (1)$$

where, f(s) denotes the peak-to-average power ratio of the pulse shaping filter, s(n) denotes a coefficient of the pulse shaping filter, M denotes the number of symbols covered by the pulse shaping filter, and N denotes a sampling rate, $1 \le i \le M$, $0 \le j \le N-1$.

In this embodiment, after the initial peak-to-average power ratio threshold and the initial filter coefficient are determined, the second determining unit 102 determines the constraint condition for optimizing the pulse shaping filter according to the initial peak-to-average power ratio threshold and the initial filter coefficient; wherein the constraint condition includes the threshold constraint in the filter coefficient sign domain.

In this embodiment, the filter coefficient sign domain of the pulse shaping filter may be obtained by using any existing method. For example, by introducing a sign domain into the above formula (1), the threshold constraint in the filter coefficient sign domain of the pulse shaping filter may be obtained, which is expressed by formula (2) below:

$$\frac{\left\{ \sum_{i=1}^{M} s(j + (i-1)*N) * \text{sign}(s_0(j + (i-1)*N)) \right\}^2}{\frac{1}{N} \sum_{n=0}^{MN} s(n)^2} \le P_r, \quad (2)$$

$$j = 0, 1, \ldots, N-1$$

$$s(n_1) \ge 0, n_1 \in I_+,$$

$$s(n_2) < 0, n_2 \in I_-, I_+ \cup I_- = \{0, 1, 2, \ldots, MN\};$$

where, $P_r$ denotes a peak-to-average power ratio threshold of the pulse shaping filter, s(n) denotes a coefficient of the pulse shaping filter, $s_0(n)$ denotes an initial coefficient of the pulse shaping filter, M denotes the number of symbols covered by the pulse shaping filter, N denotes a sampling rate, $1 \leq i \leq M$, $0 \leq j \leq N-1$, $I_+$ denotes a positive sign domain of the initial filter coefficient of the pulse shaping filter, i.e. a set of indices to which filter coefficients correspond, $s_0(n) \geq 0$ corresponding to the filter coefficients, and $I_-$ denotes a negative sign domain of the initial filter coefficient of the pulse shaping filter, i.e. a set of indices to which filter coefficients correspond, $s_0(n) < 0$ corresponding to the filter coefficients.

By expressing the threshold constraint in the filter coefficient sign domain, calculation related to an absolute value in formula (1) may be removed, so that a numerically deriving operation may be performed to the threshold constraint, thereby being used to adjust and optimize the filter coefficient and the peak-to-average power ratio threshold.

In this embodiment, the constraint condition may further include other existing constraint conditions. For example, the constraint condition may further include an inter-symbol-interference free constraint, a spectrum constraint, and a power constraint. And the constraint condition may be expressed by formula (3) below:

$$\min_s P_r \quad (3)$$

subject to $$\frac{\left\{ \sum_{i=1}^{M} s(j+(i-1)*N) * \mathrm{sign}(s_0(j+(i-1)*N)) \right\}^2}{\frac{1}{N}\sum_{n=0}^{MN} s(n)^2} \leq P_r,$$

$$j = 0, 1, \ldots, N-1$$

$$s(n_1) \geq 0, n_1 \in I_+,$$

$$s(n_2) < 0, n_2 \in I_-, I_+ \cup I_- = \{0, 1, 2, \ldots, MN\}$$

$$p(j*N) = 0, j = 0, 1, \ldots, 2M, j \neq M$$

$$S(f) \leq A(f)$$

$$p_s = \frac{1}{N}\sum_{n=0}^{MN} s(n)^2 \geq P_0 - \varepsilon$$

where, $P_r$ denotes a peak-to-average power ratio threshold of the pulse shaping filter, $s(n)$ denotes a coefficient of the pulse shaping filter, $s_0(n)$ denotes an initial coefficient of the pulse shaping filter, M denotes the number of symbols covered by the pulse shaping filter, N denotes a sampling rate, $1 \leq i \leq M$, $0 \leq j \leq N-1$, $I_+$ denotes a positive sign domain of the initial filter coefficient of the pulse shaping filter, i.e. a set of indices to which filter coefficients correspond, $s_0(n) \geq 0$ corresponding to the filter coefficients, $I_-$ denotes a negative sign domain of the initial filter coefficient of the pulse shaping filter, i.e. a set of indices to which filter coefficients correspond, $s_0(n) < 0$ corresponding to the filter coefficients, $p(j*N)=0$ denotes an inter-symbol-interference free constraint, $p(n)$ denotes a convolution of $s(n)$ and its corresponding receiving matching filter, $S(f) \leq A(f)$ denotes a spectrum constraint, $S(f)$ denotes a spectrum of $s(n)$, $$p_s = \frac{1}{N}\sum_{n=0}^{MN} s(n)^2 \geq P_0 - \varepsilon$$

denotes a power constraint, $P_s$ denotes average power of the pulse shaping filter, $P_0$ denotes initial power of the pulse shaping filter, and $\varepsilon$ denotes a power correction factor, which is a sufficiently small positive number.

In this embodiment, after the above constraint condition is established, the optimizing unit 103 adjusts the initial filter coefficient and the initial peak-to-average power ratio threshold of the pulse shaping filter in a case where the constraint condition is satisfied, until a predefined condition is satisfied, so as to obtain an optimized filter coefficient of the pulse shaping filter.

In this embodiment, the predefined condition may be set by using any existing method. For example, the predefined condition is that the number of times of iteration reaches a predefined threshold, or that an amount of adjustment of a peak-to-average power ratio threshold is less than a predefined threshold. However, a predefined condition is not limited in this embodiment of the present invention.

In this embodiment, the optimizing unit 103 may use any existing optimization algorithm to optimize the filter coefficient. For example, a penalty function method may be used for optimization.

A method for optimizing the filter coefficient by using an internal point method of penalty function methods in this embodiment shall be illustrated below. An objective function using an internal point method to optimize the filter coefficient may be expressed by formula (4) below:

$$f(s, P_r) = t \cdot P_r - \log P_r - \sum_{j=0}^{N-1} \log \delta_j - \sum_{k=0}^{MN} \log \delta_{f,k} - \log \delta_s - \sum_{n=0}^{MN} \log \delta_n \quad (4)$$

$$\delta_j = P_r^2 - \left\{ \sum_{i=1}^{M} s(j+(i-1)*N) * \mathrm{sign}(s_0(j+(i-1)*N)) \right\}^2,$$

$$\delta_{f,k} = A(k) - \left| \sum_{n=0}^{MN} e^{-j(\frac{2pi}{MN+1})nk} \cdot s(n) \right|^2$$

$$\delta_s = \frac{1}{N}\sum_{n=0}^{MN} s(n)^2 - P_0, \delta_n = s(n);$$

where, $f(s, P_r)$ denotes an optimized objective function, $P_r$ denotes the peak-to-average power ratio threshold of the pulse shaping filter, $s(n)$ denotes a coefficient of the pulse shaping filter, $s_0(n)$ denotes an initial coefficient of the pulse shaping filter, M denotes the number of symbols covered by the pulse shaping filter, N denotes a sampling rate, $1 \leq i \leq M$, $0 \leq j \leq N-1$, and t denotes a barrier parameter, $t > 0$.

By calculating gradients and Hessian matrices of the independent variables $s(n)$ and $P_r$ in the above formula (4), adjusted $s(n)$ and $P_r$ can be expressed by formula (5) below:

$$s = s - \beta V$$

$$P_r = P_r - \beta \quad (5);$$

where, V denotes a search direction, and $\beta$ denotes a search step, i.e. an amount of adjustment, $\beta \geq 0$, and the step needing to ensure that each time iteration is within a feasible domain.

Initial values of $s(n)$ and $P_r$ are the initial coefficient $s_0(n)$ and the initial peak-to-average power ratio threshold $P_{r0}$ of the pulse shaping filter, respectively. After adjustment in the above formula (5), the gradients and Hessian matrices are recalculated, and adjustments of the search direction and the search step are continued. When a predefined times of iteration is reached, the adjustments are stopped. At this moment, an optimized filter coefficient s(n) of the pulse shaping filter is obtained.

Figure 2:
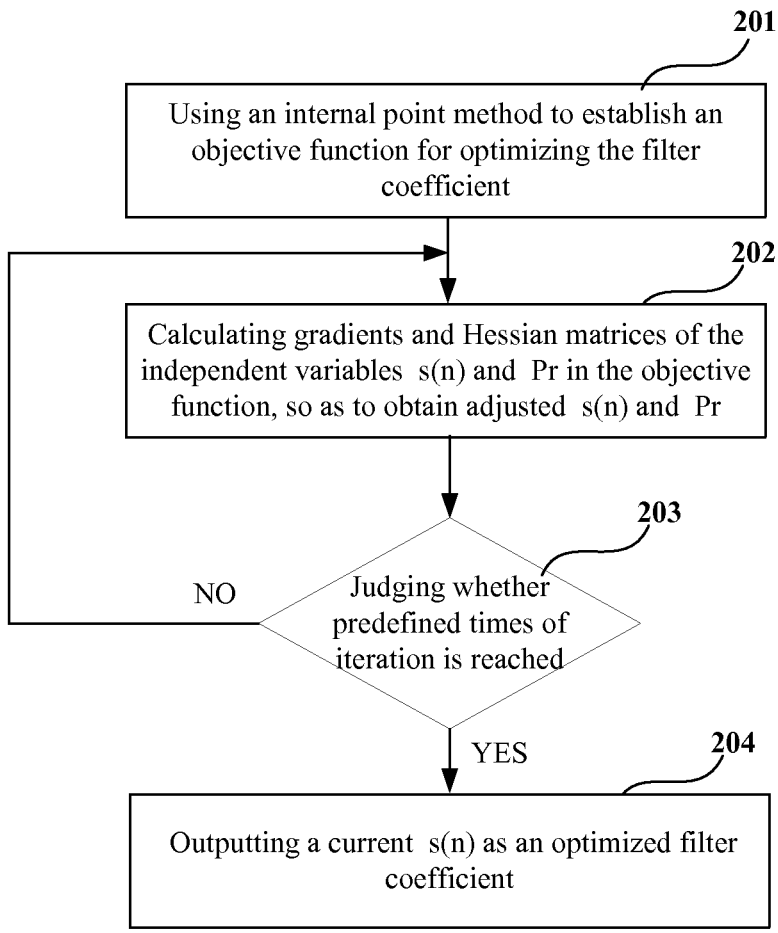
FIG. 2 is a flowchart of a method for optimizing a filter coefficient by an optimizing unit of Embodiment 1 of the present invention.

FIG. 2 is a flowchart of a method for optimizing the filter coefficient by the optimizing unit of this embodiment. As shown in FIG. 2, the method includes:

step 201: using an internal point method to establish an objective function for optimizing the filter coefficient;

step 202: calculating gradients and Hessian matrices of the independent variables s(n) and $P_r$ in the objective function, so as to obtain adjusted s(n) and $P_r$;

step 203: judging whether predefined times of iteration is reached, entering into step 204 if a judgment result is yes, and entering into step 202 for readjustment if the judgment result is no; and step 204: outputting a current s(n) as an optimized filter coefficient.

It can be seen from the above embodiment that optimization of the filter coefficient of the pulse shaping filter according to the constraint condition including the threshold constraint in the filter coefficient sign domain can simply and conveniently obtain a pulse shaping filter of a low peak-to-average power ratio, thereby efficiently lowering a peak-to-average power ratio for transmitting signals without changing the structure of an existing communication system.

Embodiment 2

Figure 3:
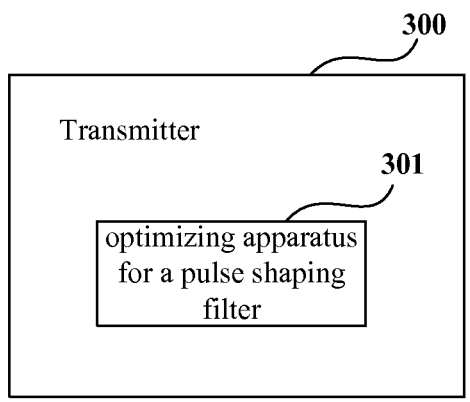
FIG. 3 is a schematic diagram of structure of a transmitter of Embodiment 2 of the present invention.

FIG. 3 is a schematic diagram of the structure of a transmitter of Embodiment 2 of the present invention. As shown in FIG. 3, the transmitter 300 includes an optimizing apparatus 301 for a pulse shaping filter, the structure and functions of the optimizing apparatus 301 for a pulse shaping filter being the same as those described in Embodiment 1, which shall not be described herein any further.

Figure 4:
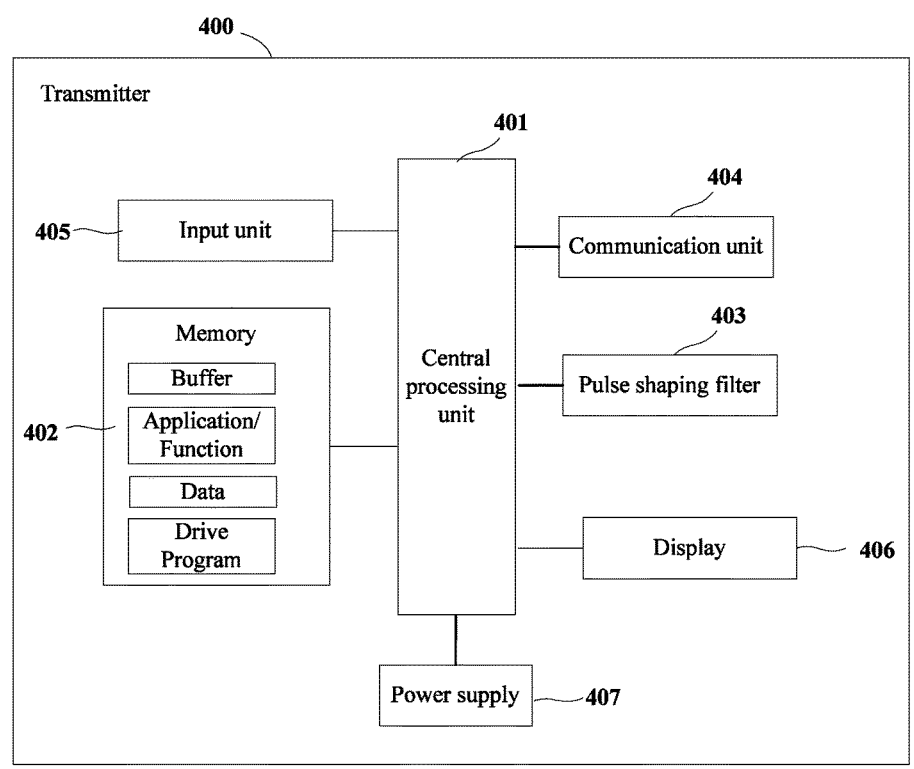
FIG. 4 is a diagram of hardware architecture of a system of a transmitter of Embodiment 2 of the present invention.

FIG. 4 is a diagram of hardware architecture of a system of a transmitter 400 of Embodiment 2 of the present invention. As shown in FIG. 4, the transmitter 400 may include a central processing unit 401 and a memory 402, the memory 402 being coupled to the central processing unit 401. This figure is exemplary only, and other types of structures may be used to supplement or replace this structure for the realization of telecommunications functions or other functions.

As shown in FIG. 4, the transmitter 400 may further include a pulse shaping filter 403, a communication unit 404, an input unit 405, a display 406, and a power supply 407.

In a mode of implementation, functions of an optimizing apparatus for the pulse shaping filter may be integrated into the central processing unit 401. Wherein, the central processing unit 401 may be configured to: determine an initial peak-to-average power ratio threshold of the pulse shaping filter, and determine an initial filter coefficient of the pulse shaping filter according to the initial peak-to-average power ratio threshold; determine a constraint condition for optimizing the pulse shaping filter according to the initial peak-to-average power ratio threshold and the initial filter coefficient of the pulse shaping filter; wherein the constraint condition includes a threshold constraint in a filter coefficient sign domain; and adjust the initial peak-to-average power ratio threshold and the initial filter coefficient of the pulse shaping filter in a case where the constraint condition is satisfied, until a predefined condition is satisfied, so as to obtain an optimized filter coefficient of the pulse shaping filter.

Wherein, the central processing unit 401 may further be configured to: adjust the initial peak-to-average power ratio threshold and the initial filter coefficient of the pulse shaping filter by using a penalty function method in a case where the constraint condition is satisfied.

The central processing unit 401 may further be configured to: use formulae (2) and (3) in Embodiment 1 as the constraint condition to optimize the filter coefficient of the pulse shaping filter.

In another mode of implementation, the optimizing apparatus for the pulse shaping filter and the central processing unit 401 may be configured separately. For example, the optimizing apparatus for the pulse shaping filter may be configured as a chip connected to the central processing unit 401, with the functions of the optimizing apparatus for the pulse shaping filter being realized under control of the central processing unit.

In this embodiment, after an optimized filter coefficient is obtained, it is provided to the pulse shaping filter 403 for corresponding setting.

In this embodiment, the transmitter 400 does not necessarily include all the components shown in FIG. 4.

As shown in FIG. 4, the central processing unit 401 is sometimes referred to as a controller or control, and may include a microprocessor or other processor devices and/or logic devices. The central processing unit 401 receives input and controls operations of every components of the transmitter 400.

The memory 402 may be, for example, one or more of a buffer memory, a flash memory, a hard drive, a mobile medium, a volatile memory, a nonvolatile memory, or other suitable devices. And the central processing unit 401 may execute the program stored in the memory 402, so as to realize information storage or processing, etc. Functions of other parts are similar to those of the prior art, which shall not be described herein any further. The parts of the transmitter 400 may be realized by specific hardware, firmware, software, or any combination thereof, without departing from the scope of the present invention.

It can be seen from the above embodiment that optimization of the filter coefficient of the pulse shaping filter according to the constraint condition including the threshold constraint in the filter coefficient sign domain can simply and conveniently obtain a pulse shaping filter of a low peak-to-average power ratio, thereby efficiently lowering a peak-to-average power ratio for transmitting signals without changing the structure of an existing communication system.

Embodiment 3

Figure 5:
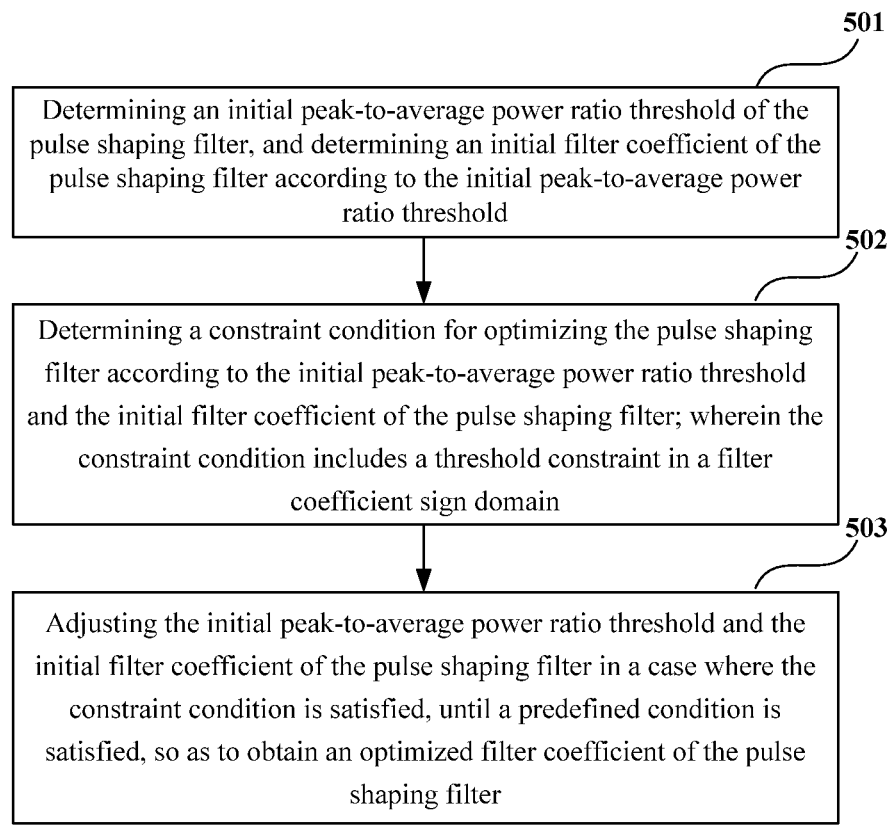
FIG. 5 is a flowchart of an optimizing method for a pulse shaping filter of Embodiment 3 of the present invention.

FIG. 5 is a flowchart of an optimizing method for a pulse shaping filter of Embodiment 3 of the present invention, corresponding to the optimizing apparatus for a pulse shaping filter of Embodiment 1. As shown in FIG. 5, the method includes:

step 501: determining an initial peak-to-average power ratio threshold of the pulse shaping filter, and determining an initial filter coefficient of the pulse shaping filter according to the initial peak-to-average power ratio threshold;

step 502: determining a constraint condition for optimizing the pulse shaping filter according to the initial peak-to-average power ratio threshold and the initial filter coefficient of the pulse shaping filter; wherein the constraint condition includes a threshold constraint in a filter coefficient sign domain; and step 503: adjusting the initial peak-to-average power ratio threshold and the initial filter coefficient of the pulse shaping filter in a case where the constraint condition is satisfied, until a predefined condition is satisfied, so as to obtain an optimized filter coefficient of the pulse shaping filter.

In this embodiment, the constraint condition may further include other existing constraint conditions. For example, the constraint condition may include an inter-symbol-interference free constraint, a spectrum constraint and a power constraint.

In this embodiment, the methods for determining the initial peak-to-average power ratio threshold and the initial filter coefficient of the pulse shaping filter, determining the constraint condition for optimizing the pulse shaping filter, and optimizing the filter coefficient under such a constraint condition, are identical to what are described in Embodiment 1, which shall not be described herein any further.

It can be seen from the above embodiment that optimization of the filter coefficient of the pulse shaping filter according to the constraint condition including the threshold constraint in the filter coefficient sign domain can simply and conveniently obtain a pulse shaping filter of a low peak-to-average power ratio, thereby efficiently lowering a peak-to-average power ratio for transmitting signals without changing the structure of an existing communication system.

Embodiment 4

Figure 6:
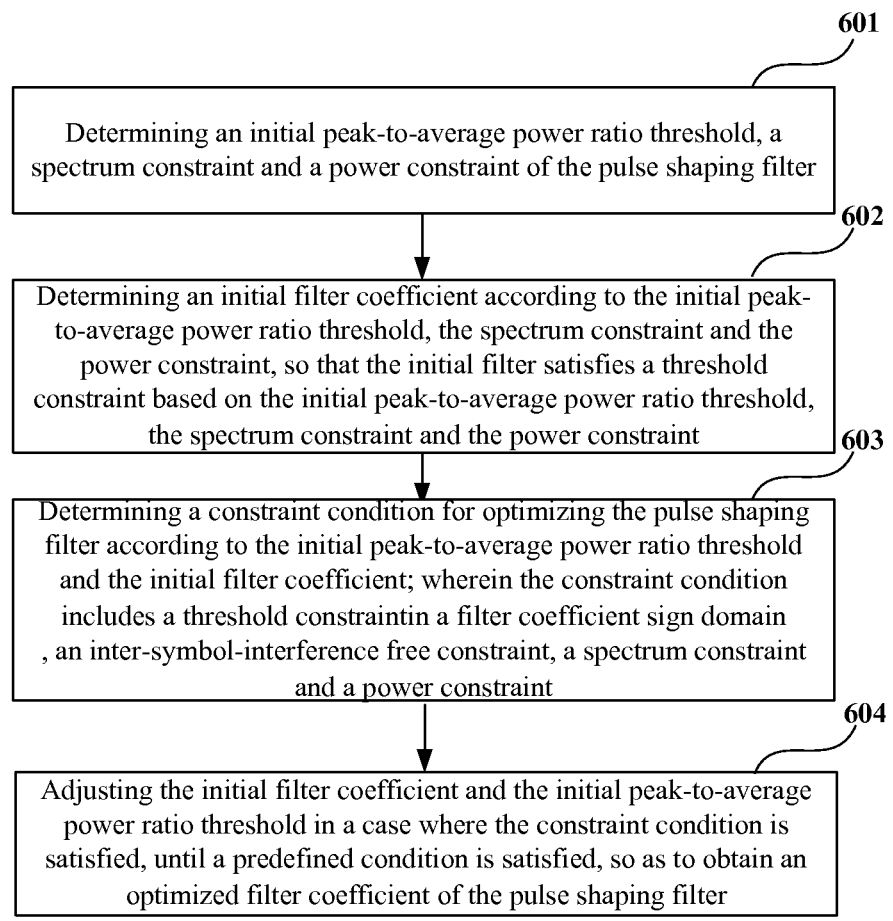
FIG. 6 is a flowchart of an optimizing method for a pulse shaping filter of Embodiment 4 of the present invention.

FIG. 6 is a flowchart of an optimizing method for a pulse shaping filter of Embodiment 4 of the present invention, corresponding to the optimizing apparatus for a pulse shaping filter of Embodiment 1. As shown in FIG. 6, the method includes:

step 601: determining an initial peak-to-average power ratio threshold, a spectrum constraint and a power constraint of the pulse shaping filter;

step 602: determining an initial filter coefficient according to the initial peak-to-average power ratio threshold, the spectrum constraint and the power constraint, so that the initial filter satisfies a threshold constraint based on the initial peak-to-average power ratio threshold, the spectrum constraint and the power constraint;

step 603: determining a constraint condition for optimizing the pulse shaping filter according to the initial peak-to-average power ratio threshold and the initial filter coefficient; wherein the constraint condition includes a threshold constraint in a filter coefficient sign domain, an inter-symbol-interference free constraint, a spectrum constraint and a power constraint; and step 604: adjusting the initial filter coefficient and the initial peak-to-average power ratio threshold in a case where the constraint condition is satisfied, until a predefined condition is satisfied, so as to obtain an optimized filter coefficient of the pulse shaping filter.

In this embodiment, the methods for determining the initial peak-to-average power ratio threshold and the initial filter coefficient of the pulse shaping filter, determining the constraint condition for optimizing the pulse shaping filter, determining the constraint conditions and optimizing the filter coefficient under such constraint conditions, are identical to what are described in Embodiment 1, which shall not be described herein any further.

It can be seen from the above embodiment that optimization of the filter coefficient of the pulse shaping filter according to the constraint condition including the threshold constraint in the filter coefficient sign domain can simply and conveniently obtain a pulse shaping filter of a low peak-to-average power ratio, thereby efficiently lowering a peak-to-average power ratio for transmitting signals without changing the structure of an existing communication system.

An embodiment of the present invention further provides a computer-readable program, wherein when the program is executed in an optimizing apparatus for a pulse shaping filter or a transmitter, the program enables the computer to carry out the optimizing method for a pulse shaping filter as described in Embodiment 3 or 4 in the optimizing apparatus for a pulse shaping filter or the transmitter.

An embodiment of the present invention further provides a storage medium in which a computer-readable program is stored, wherein the computer-readable program enables the computer to carry out the optimizing method for a pulse shaping filter as described in Embodiment 3 or 4 in an optimizing apparatus for a pulse shaping filter or a transmitter.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

The invention claimed is:

1. An optimizing apparatus for a pulse shaping filter, comprising:

a first determining unit configured to determine an initial peak-to-average power ratio threshold of the pulse shaping filter, and determine an initial filter coefficient of the pulse shaping filter according to the initial peak-to-average power ratio threshold;

a second determining unit configured to determine a constraint condition for optimizing the pulse shaping filter according to the initial peak-to-average power ratio threshold and the initial filter coefficient of the pulse shaping filter; wherein the constraint condition comprises a threshold constraint in a filter coefficient sign domain; and an optimizing unit configured to adjust the initial peak-to-average power ratio threshold and the initial filter coefficient of the pulse shaping filter in a case where the constraint condition is satisfied, until a predefined condition is satisfied, so as to obtain an optimized filter coefficient of the pulse shaping filter, wherein the threshold constraint in the filter coefficient sign domain is expressed by formula (1) below:

$$\frac{\left\{\sum_{i=1}^{M} s(j+(i-1)*N)*\text{sign}(s_0(j+(i-1)*N))\right\}^2}{\frac{1}{N}\sum_{n=0}^{MN} s(n)^2} \leq P_r, \quad (1)$$

$$j = 0, 1, \ldots, N-1$$

$$s(n_1) \geq 0, n_1 \in I_+,$$

$$s(n_2) < 0, n_2 \in I_-, I_+ \cup I_- = \{0, 1, 2, \ldots, MN\};$$

where, $P_r$ denotes a peak-to-average power ratio threshold of the pulse shaping filter, $s(n)$ denotes a coefficient of the pulse shaping filter, $s_0(n)$ denotes an initial filter coefficient of the pulse shaping filter, M denotes the number of symbols covered by the pulse shaping filter, N denotes a sampling rate, $1 \leq i \leq M$, $0 \leq j \leq N-1$, $I_+$ a positive sign domain of the initial filter coefficient of the pulse shaping filter, i.e. a set of indices to which filter coefficients correspond, $s_0(n) \geq 0$ corresponding to the filter coefficients, and $I_-$ denotes a negative sign domain of the initial filter coefficient of the pulse shaping filter, i.e. a set of indices to which filter coefficients correspond, $s_0(n) < 0$ corresponding to the filter coefficients.

2. The apparatus according to claim 1, wherein the constraint condition is expressed by formula (2) below:

$$\min_{s} P_r \qquad (2)$$

subject to $$\frac{\left\{\sum_{i=1}^{M} s(j+(i-1)*N) * \text{sign}(s_0(j+(i-1)*N))\right\}^2}{\frac{1}{N}\sum_{n=0}^{MN} s(n)^2} \leq P_r,$$

$$j = 0, 1, \ldots, N-1$$

$$s(n_1) \geq 0, n_1 \in I_+,$$

$$s(n_2) < 0, n_2 \in I_-, I_+ \cup I_- = \{0, 1, 2, \ldots, MN\}$$

$$p(j*N) = 0, j = 0, 1, \ldots, 2M, j \neq M$$

$$S(f) \leq A(f)$$

$$p_s = \frac{1}{N}\sum_{n=0}^{MN} s(n)^2 \geq P_0 - \varepsilon$$

where, $P_r$ denotes a peak-to-average power ratio threshold of the pulse shaping filter, $s(n)$ denotes a coefficient of the pulse shaping filter, $s_0(n)$ denotes an initial filter coefficient of the pulse shaping filter, M denotes the number of symbols covered by the pulse shaping filter, N denotes a sampling rate, $1 \leq i \leq M$, $0 \leq j \leq N-1$, $I_+$ denotes a positive sign domain of the initial filter coefficient of the pulse shaping filter, i.e. a set of indices to which filter coefficients correspond, $s_0(n) \geq 0$ corresponding to the filter coefficients, $I_-$ denotes a negative sign domain of the initial filter coefficient of the pulse shaping filter, i.e. a set of indices to which filter coefficients correspond, $s_0(n) < 0$ corresponding to the filter coefficients, $p(j*N)=0$ denotes an inter-symbol-interference free constraint, $p(n)$ denotes a convolution of $s(n)$ and its corresponding receiving matching filter, $S(f) \leq A(f)$ denotes a spectrum constraint, $S(f)$ denotes a spectrum of $s(n)$, $$p_s = \frac{1}{N}\sum_{n=0}^{MN} s(n)^2 \geq P_0 - \varepsilon$$

denotes a power constraint, $P_s$ denotes average power of the pulse shaping filter, $P_0$ denotes initial power of the pulse shaping filter, and $\varepsilon$ denotes a power correction factor, which is a sufficiently small positive number.

3. The apparatus according to claim 1, wherein the optimizing unit adjusts the initial peak-to-average power ratio threshold and the initial filter coefficient of the pulse shaping filter by using a penalty function method in a case where the constraint condition is satisfied.

4. The apparatus according to claim 1, wherein the constraint condition further comprises an inter-symbol-interference free constraint, a spectrum constraint and a power constraint.

5. A transmitter, comprising the optimizing apparatus for a pulse shaping filter as claimed in claim 1.

6. An optimizing method for a pulse shaping filter, comprising:
   determining an initial peak-to-average power ratio threshold of the pulse shaping filter, and determining an initial filter coefficient of the pulse shaping filter according to the initial peak-to-average power ratio threshold;
   determining a constraint condition for optimizing the pulse shaping filter according to the initial peak-to-average power ratio threshold and the initial filter coefficient of the pulse shaping filter; wherein the constraint condition comprises a threshold constraint in a filter coefficient sign domain; and
   adjusting the initial peak-to-average power ratio threshold and the initial filter coefficient of the pulse shaping filter in a case where the constraint condition is satisfied, until a predefined condition is satisfied, so as to obtain an optimized filter coefficient of the pulse shaping filter,
   wherein the threshold constraint in the filter coefficient sign domain is expressed by formula (1) below:

$$\frac{\left\{\sum_{i=1}^{M} s(j+(i-1)*N) * \text{sign}(s_0(j+(i-1)*N))\right\}^2}{\frac{1}{N}\sum_{n=0}^{MN} s(n)^2} \leq P_r, \qquad (1)$$

$$j = 0, 1, \ldots, N-1$$

$$s(n_1) \geq 0, n_1 \in I_+,$$

$$s(n_2) < 0, n_2 \in I_-, I_+ \cup I_- = \{0, 1, 2, \ldots, MN\};$$

where, $P_r$ denotes a peak-to-average power ratio threshold of the pulse shaping filter, $s(n)$ denotes a coefficient of the pulse shaping filter, $s_0(n)$ denotes an initial filter coefficient of the pulse shaping filter, M denotes the number of symbols covered by the pulse shaping filter, N denotes a sampling rate, $1 \leq i \leq M$, $0 \leq j \leq N-1$, $I_+$ denotes a positive sign domain of the initial filter coefficient of the pulse shaping filter, i.e. a set of indices to which filter coefficients correspond, $s_0(n) \geq 0$ corresponding to the filter coefficients, and $I_-$ denotes a negative sign domain of the initial filter coefficient of the pulse shaping filter, i.e. a set of indices to which filter coefficients correspond, $s_0(n) < 0$ corresponding to the filter coefficients.

7. The method according to claim 6, wherein the constraint condition is expressed by formula (2) below:

$$\min_s P_r \quad (2)$$

subject to $$\frac{\left\{\sum_{i=1}^{M} s(j+(i-1)*N)*\text{sign}(s_0(j+(i-1)*N))\right\}^2}{\frac{1}{N}\sum_{n=0}^{MN} s(n)^2} \leq P_r,$$

$$j = 0, 1, \ldots, N-1$$

$$s(n_1) \geq 0, n_1 \in I_+,$$

$$s(n_2) < 0, n_2 \in I_-, I_+ \cup I_- = \{0, 1, 2, \ldots, MN\}$$

$$p(j*N) = 0, j = 0, 1, \ldots, 2M, j \neq M$$

$$S(f) \leq A(f)$$

$$p_s = \frac{1}{N}\sum_{s=0}^{MN} s(n)^2 \geq P_0 - \varepsilon$$

where, $P_r$ denotes a peak-to-average power ratio threshold of the pulse shaping filter, s(n) denotes a coefficient of the pulse shaping filter, $s_0(n)$ denotes an initial filter coefficient of the pulse shaping filter, M denotes the number of symbols covered by the pulse shaping filter, N denotes a sampling rate, $1 \leq i \leq M$, $0 \leq j \leq N-1$, $I_+$ denotes a positive sign domain of the initial filter coefficient of the pulse shaping filter, i.e. a set of indices to which filter coefficients correspond, $s_0(n) \geq 0$ corresponding to the filter coefficients, $I_-$ denotes a negative sign domain of the initial filter coefficient of the pulse shaping filter, i.e. a set of indices to which filter coefficients correspond, $s_0(n) < 0$ corresponding to the filter coefficients, p(j*N)=0 denotes an inter-symbol-interference free constraint, p(n) denotes a convolution of s(n) and its corresponding receiving matching filter, $S(f) \leq A(f)$ denotes a spectrum constraint, S(f) denotes a spectrum of s(n), $$p_s = \frac{1}{N}\sum_{n=0}^{MN} s(n)^2 \geq P_0 - \varepsilon$$

denotes a power constraint, $P_s$ denotes average power of the pulse shaping filter, $P_0$ denotes initial power of the pulse shaping filter, and $\varepsilon$ denotes a power correction factor, which is a sufficiently small positive number.

8. The method according to claim 6, wherein the adjusting the initial peak-to-average power ratio threshold and the initial filter coefficient of the pulse shaping filter in a case where the constraint condition is satisfied comprises:

adjusting the initial peak-to-average power ratio threshold and the initial filter coefficient of the pulse shaping filter by using a penalty function method in a case where the constraint condition is satisfied.

* * * * *